US009573276B2

(12) United States Patent
Stephens, Jr.

(10) Patent No.: US 9,573,276 B2
(45) Date of Patent: Feb. 21, 2017

(54) SPACE EXPLORATION WITH HUMAN PROXY ROBOTS

(76) Inventor: Kenneth Dean Stephens, Jr., Waialua, HI (US)

( * ) Notice: Subject to any disclaimer, the term of this patent is extended or adjusted under 35 U.S.C. 154(b) by 562 days.

(21) Appl. No.: 13/479,128

(22) Filed: May 23, 2012

(65) Prior Publication Data

US 2013/0211587 A1 Aug. 15, 2013

Related U.S. Application Data

(60) Provisional application No. 61/599,204, filed on Feb. 15, 2012, provisional application No. 61/613,935, filed on Mar. 21, 2012.

(51) Int. Cl.
| | |
|---|---|
| *B25J 9/16* | (2006.01) |
| *B25J 3/04* | (2006.01) |
| *B25J 11/00* | (2006.01) |
| *B64G 4/00* | (2006.01) |
| *G06N 3/00* | (2006.01) |
| *B64G 1/10* | (2006.01) |

(52) U.S. Cl.
CPC ............. *B25J 9/1689* (2013.01); *B25J 3/04* (2013.01); *B25J 11/00* (2013.01); *B64G 4/00* (2013.01); *G06N 3/008* (2013.01); *B64G 2001/1064* (2013.01); *B64G 2004/005* (2013.01); *G05B 2219/40116* (2013.01); *G05B 2219/40191* (2013.01); *G06N 3/004* (2013.01)

(58) Field of Classification Search
CPC ............ B25J 9/1689; B25J 3/04; B25J 11/00; B25J 9/0006; B64G 4/00; B64G 2001/01064; B64G 2004/005; B64G 2001/01071; G05B 2219/40191; G05B 2219/40116; G06N 3/004; G06N 3/008; G06N 3/0409; B62D 57/02

See application file for complete search history.

(56) References Cited

PUBLICATIONS

Youtube video uploaded Mar. 12, 2012 Titled Telesar-V vs SAR; https://www.youtube.com/watch?v=UYeos6DAZQk.*
Youtube video uploaded Nov. 2, 2009 Titled Telesar I; https://www.youtube.com/watch?v=UBjljXV8cks.*
Youtube video uploaded Nov. 6, 2011 Titled Telexistence Robot Avatar Transmits Sight, Hearing and Touch—Telesar V; https://www.youtube.com/watch?v=ZMF0p15GPYg.*

* cited by examiner

*Primary Examiner* — Jason Holloway

(57) ABSTRACT

A system and method of space exploration with a human-controlled proxy robot surrogates is disclosed. The method includes: training the human controlled proxy robot surrogates using human handlers; controlling the human-controlled proxy robot surrogates using the human handlers; and deploying a plurality of human-controlled proxy robot surrogates for extraterrestrial missions, missions on Earth, the Moon, and near-Earth locations. Each of the human-controlled proxy robot surrogates are in communication with each of the human handlers and wherein each one of the plurality of proxy robot surrogates is paired with each one of the plurality of human handlers. The human-controlled proxy robot surrogates further comprise an artificial intelligence (AI). The artificial intelligence of the disclosed method includes learned behavior.

10 Claims, 8 Drawing Sheets

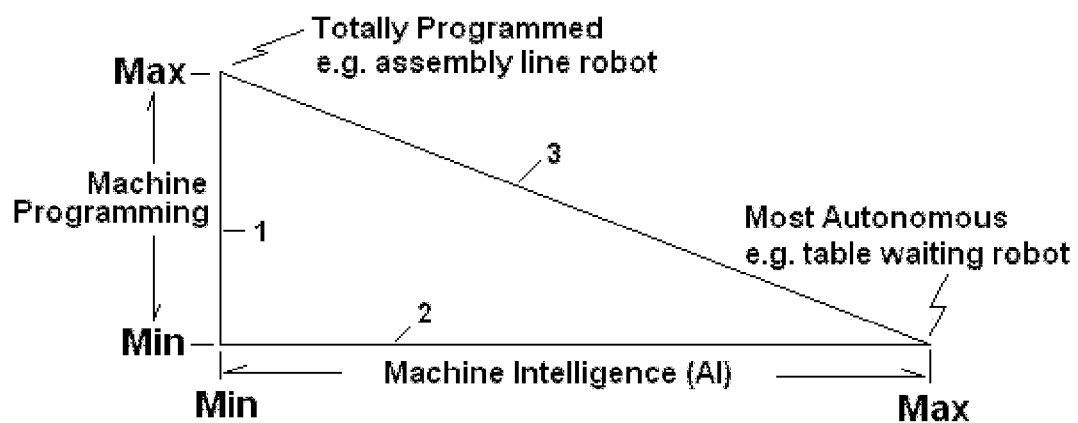
Figure 1: Prior Art Robotics
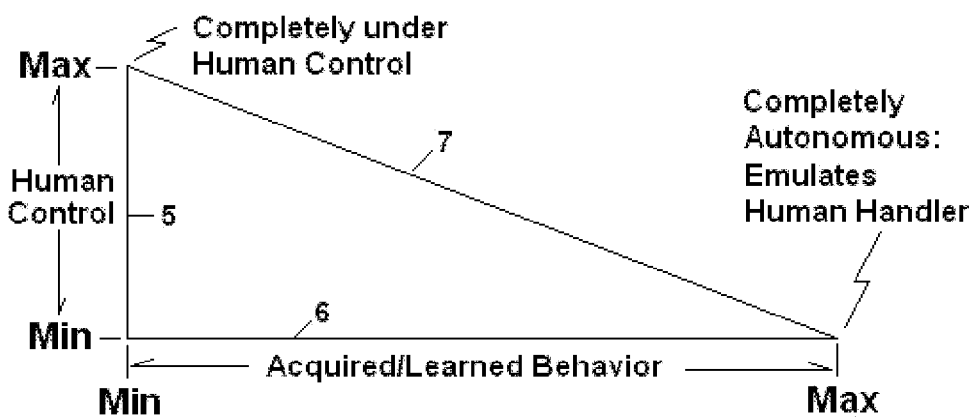
Figure 2: Proxy Robotics

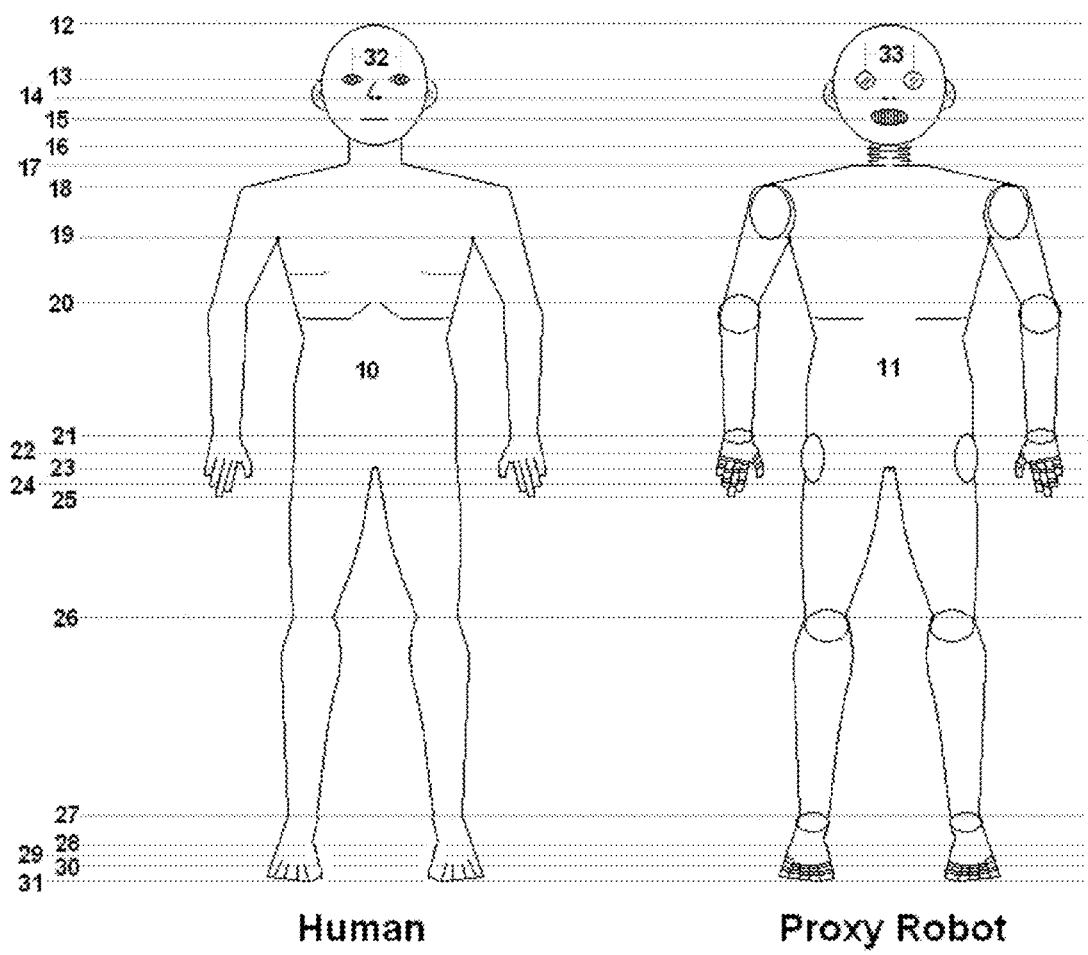
Figure 3: Human-Proxy Comparison

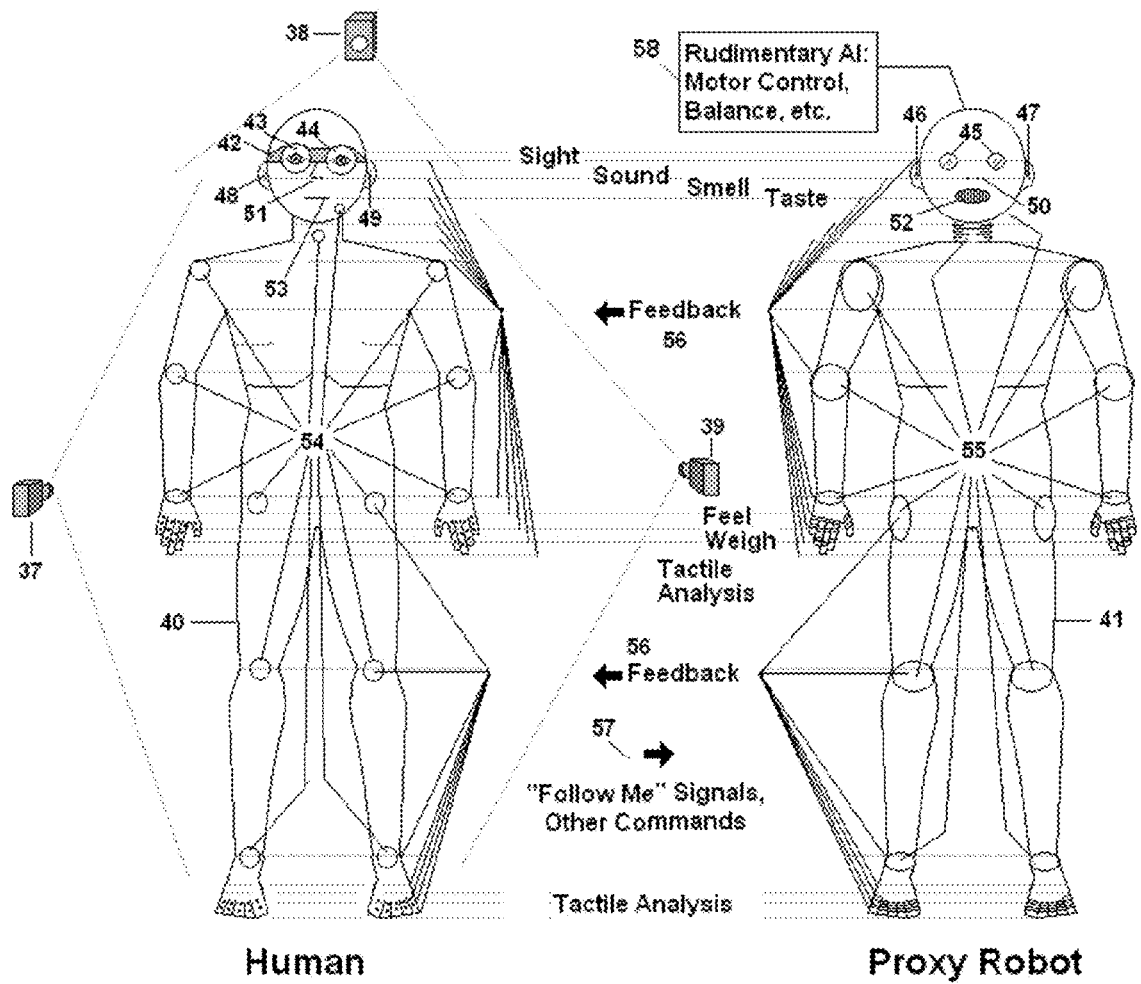

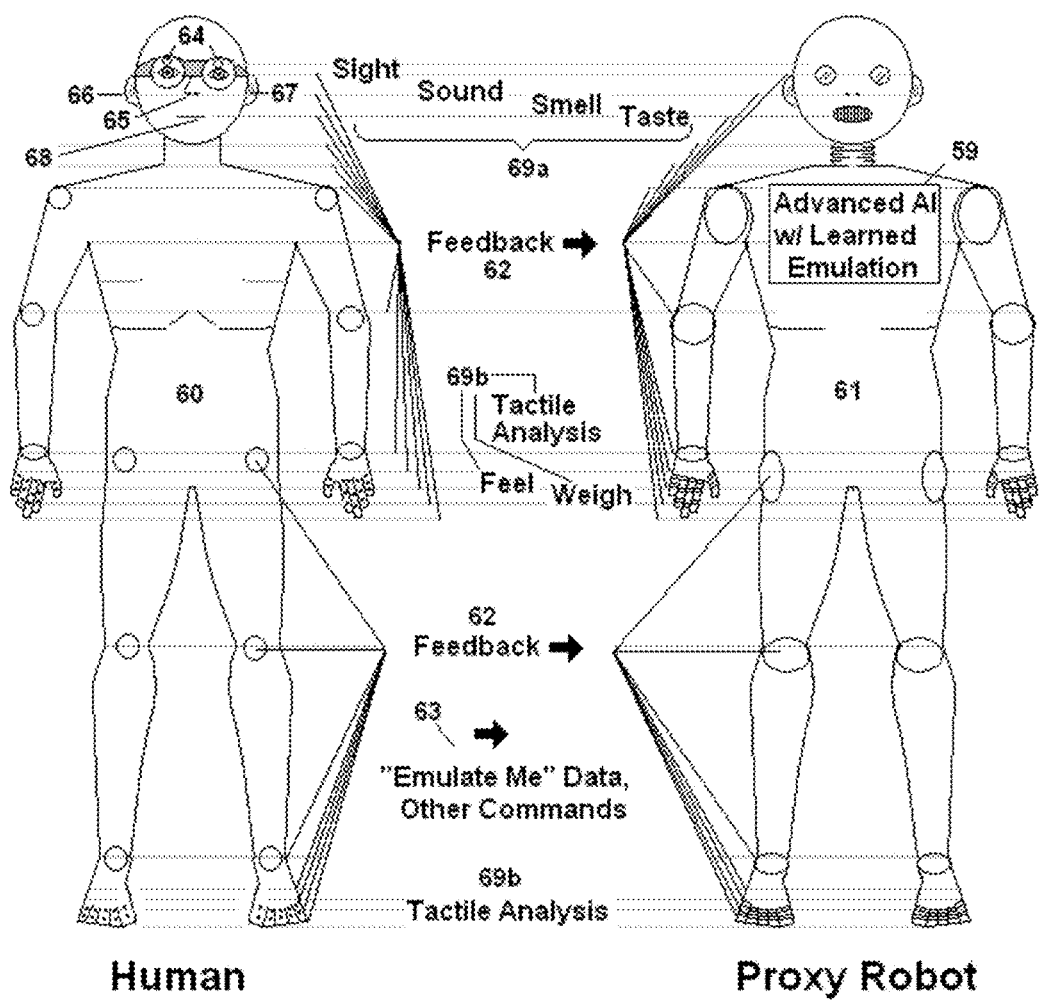
Figure 5: Proxy Learns from Human Action

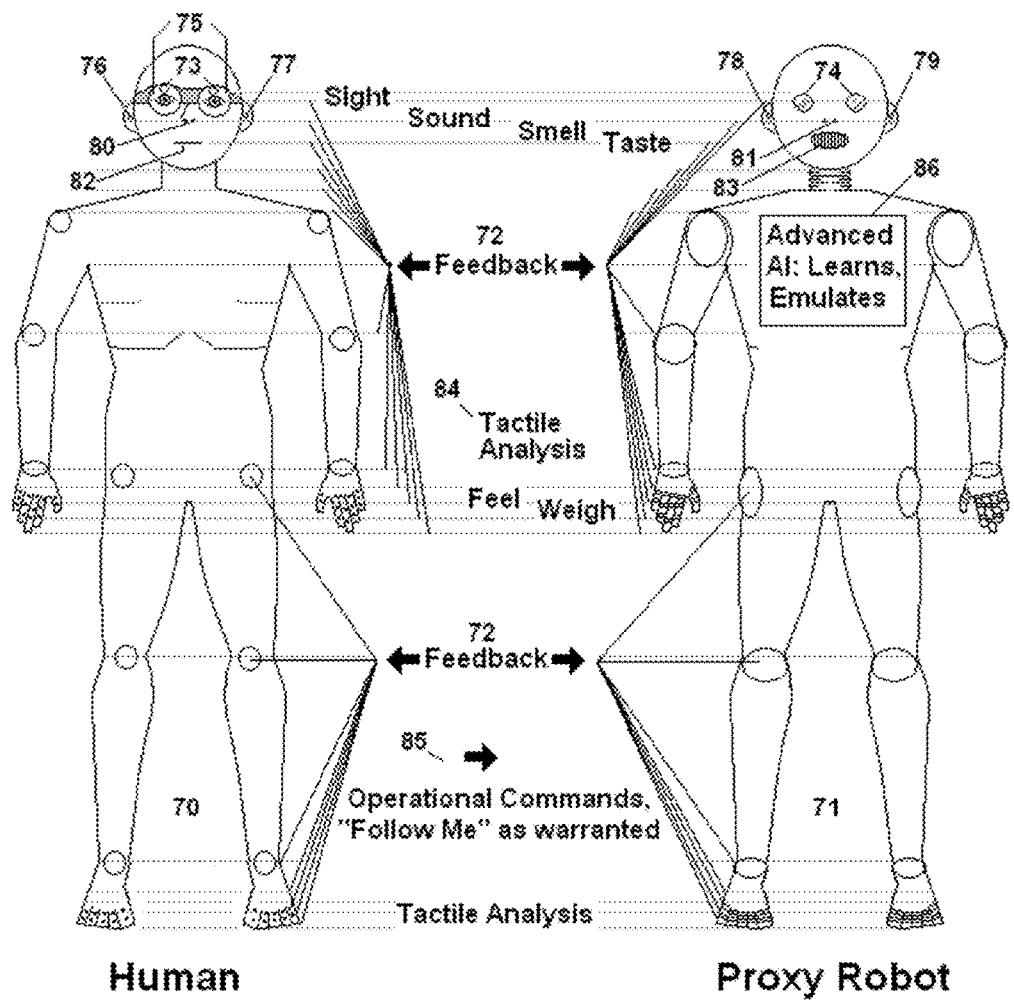

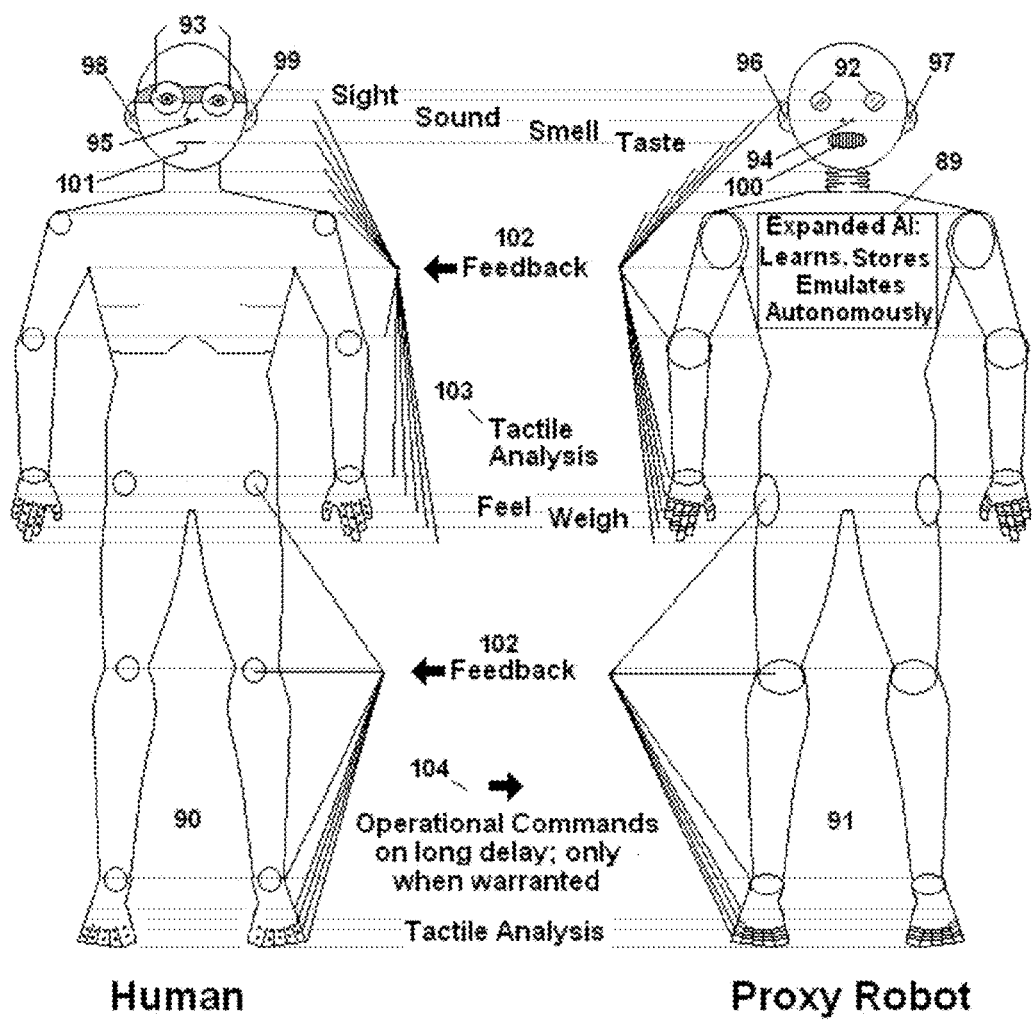

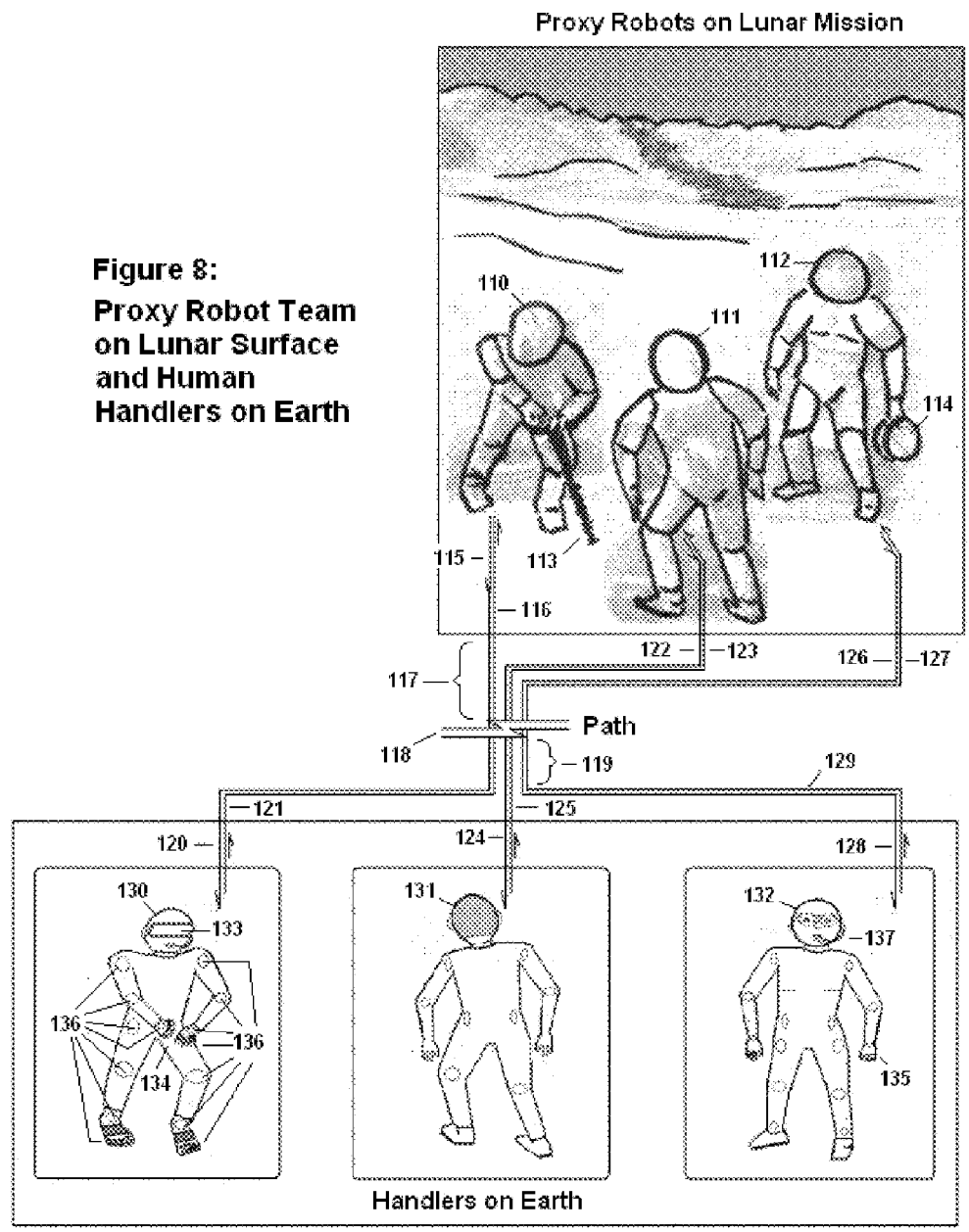

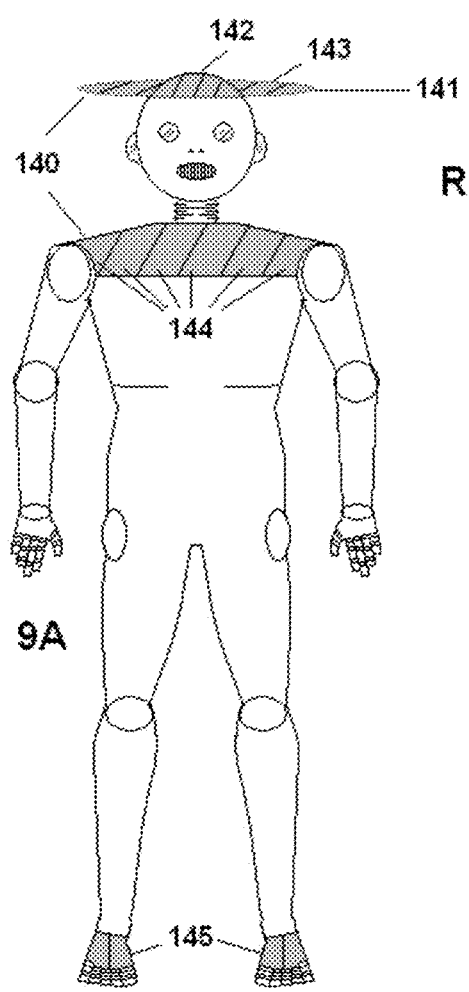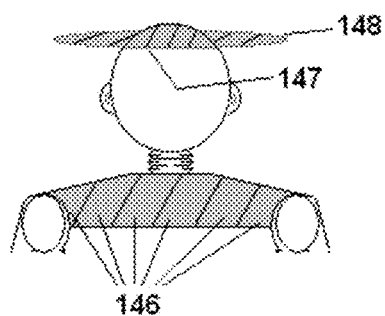
Figure 9:
Robotic Solar Energy System

SPACE EXPLORATION WITH HUMAN PROXY ROBOTS

CLAIM OF PRIORITY

The present invention claims priority to Provisional U.S. Patent Application No. 61/599,204 filed Feb. 15, 2012, entitled "Space Exploration with Human Proxy Robots" and Provisional U.S. Patent Application No. 61/613,935, filed Mar. 21, 2012, entitled "Remote Environment Simulator for Human Proxy Robot Handlers." The following formal U.S. patent application has base in the substance of the earlier Provisional filings.

BACKGROUND OF THE INVENTION

A great controversy surrounds the subject of space exploration, with one camp firmly believing that a human presence is absolutely necessary on the moon, mars and other heavenly bodies, and another just as certain that remote-controlled machines and instruments give far more return for each dollar invested.

Both positions have merit; both have weaknesses. Manned space exploration proponents state convincingly that human "boots on the ground" can do so much more than even the smartest and most cleverly-designed machines, while those in the other camp cite the inherent cost difference and risks involved in sending humans rather than machines to explore our neighboring bodies in space.

The present invention describes a middle course that goes far in satisfying the need for human presence while avoiding the inherent risks and enormous cost to send human astronauts to places like the moon and mars. Described below is a method of achieving human telepresence to explore the solar system without the risk to life and huge costs involved in actually transporting humans around space; namely, exploration by means of robot proxies "trained" and operated by specialists on earth who see what the proxy sees, feel what it feels, and assist it in making judgment calls in their mutual specialty.

A mission to mars that is already in progress will place a 2000-lb roving vehicle on the surface of that planet. For the same cost, a team of 5 proxy astronauts and associated exploration equipment could explore mars with human telepresence, including human-proxy teams specializing in geology, life sciences, even construction of shelters and landing pads for future missions. Since round-trip earth-mars communication takes between 5 and 40 minutes, each proxy would have artificial intelligence (AI) capability to allow it to be trained it to behave as much as possible like its human handler(s).

SUMMARY OF THE INVENTION

A system and method of space exploration with a human-controlled proxy robot surrogates is disclosed. The method comprises: training the human controlled proxy robot surrogates using human handlers; controlling the human-controlled proxy robot surrogates using the human handlers; and deploying a plurality of human-controlled proxy robot surrogates for extraterrestrial missions, missions on earth, the moon, and near-earth locations. Each of the human-controlled proxy robot surrogates are in communication with each of the human handlers and wherein each one of the plurality of proxy robot surrogates is paired with each one of the plurality of human handlers. The human-controlled proxy robot surrogates further comprise an artificial intelligence (AI). The artificial intelligence of the disclosed method includes learned behavior.

Further disclosed is a human telepresence on the earth, utilizing a plurality of proxy human robots in response to disasters including fire, earthquakes, severe weather and flooding; to environmental issues including disease and radiation; to mining and other accidents; for exploration, recovery or other activities in extreme conditions such as ocean depths, volcanoes, the rarified atmosphere of altitude, extreme hot or cold, or other situations that pose a danger. On earth, on the moon and in other near-earth mission situations, it is also possible to utilize proxy robots with minimal AI, wherein the mission specialist controls all proxy robot actions.

DESCRIPTION OF THE DRAWINGS

FIG. 1 illustrates prior art that graphs robot autonomy, contrasting the present invention with most prior art robotics.

FIG. 2 illustrates another prior art that graphs robot autonomy, contrasting the present invention with most prior art robotics.

FIG. 3 illustrates an exemplary embodiment of comparisons of the general form of a proxy robot surrogate and its human handler.

FIG. 4 illustrate an exemplary embodiment of a scenario wherein a proxy robot surrogate is under maximum human control.

FIG. 5 illustrates another embodiment of the invention, wherein a proxy robot learns from interaction with its human handler.

FIG. 6 illustrates an exemplary embodiment of a scenario wherein a human handler and proxy robot operate side-by-side as a team.

FIG. 7 illustrates an exemplary embodiment of a near-autonomous proxy robot, as might be encountered on a mission to mars or some other place too costly in risk and treasure for humans to achieve with any frequency.

FIG. 8 illustrates an exemplary embodiment of a lunar mission with a team of three proxy robots on the lunar surface controlled by three human handlers on earth.

FIG. 9A illustrates an exemplary embodiment of a Robotic Solar Energy System.

FIG. 9B illustrates another exemplary embodiment of a Robotic Soar Energy System.

DETAILED DESCRIPTION OF THE INVENTION

A first exemplary embodiment of the present invention is to disclose a viable methodology for human space exploration utilizing proxy robot surrogates in space taught and controlled by humans on earth.

A proxy mission to the moon or elsewhere should start with some questions: Is this the first mission back to the moon since the manned Apollo visits in the late 1960s and early 70s? Is this mission unmanned except for proxy human telepresence? If so, what might the proxy team be doing? Missions could involve, among other activities, geological exploration and analysis with an eye to mining or processing materials; preparation of lunar bases for future manned exploration or even colonization, and the construction of facilities for the assembly and launching of missions to mars and other distant points.

Thus, another embodiment of the present invention is to provide a method of achieving human telepresence on the moon, mars and other planets and locations in space.

Specifically, referring to Prior Art FIG. 1, machine programming goes upward from minimum to maximum on vertical scale 1, while machine intelligence (artificial intelligence or AI) increases to the right from minimum to maximum on horizontal scale 2. It can be seen that maximum machine programming with minimum AI will produce a "dumb" robot such as one welding one section of a car on an assembly line, while minimizing machine programming and maximizing AI will yield a robot capable of making decisions and acting upon them autonomously. Sloping line 3 charts degree of autonomy against both machine programming and machine intelligence.

The present invention isn't built on "traditional" robotics, but it does combine and advance a number of known technologies. The idea of robotic surrogates to humans, for example, was put forth in science fiction form in a Hollywood motion picture "Avatar" in 2009. In this movie and others, motion and performance capture technology was used to record the movements of a human and translate them into a digital surrogate image sequence on the big screen. U.S. Pat. No. 5,986,660 (Sweatt, et al) is exemplary of this technology.

This motion and performance capture capability provides good prior art to the current invention: rather than translate positions and movements into images we can instead translate them into digital signals that control the position and every movement of an actual a proxy robot. Prior art in the latter direction has come from Susumu Tachi and his colleagues: c.f. US Patent Application No. 20030178556, and http://www.ndtv.com/article/world/japan-scientist-makes-avatar-robot-175039

Referring to FIG. 2 an exemplary non-limiting graph similar to that of FIG. 1 is shown, but as applied to proxy robotics as taught in the present invention. In this figure, vertical scale 5 represents human control rather than machine programming, while horizontal scale 6 represents acquired or learned behavior. To site an example of acquired behavior, this might be the result of sharing the learning of other proxy robots, past missions, or some template characteristics of a particular discipline such as geology or microbiology.

Learned behavior, on the other hand, comes from the actual interchange of information and field activities shared between a proxy robot and its human handler(s) on missions, whether practice or actual. Another embodiment of the present invention is to provide human telepresence on the moon, mars and other locations in space through proxy robots trained and controlled by human mission specialists. More will be disclosed on this subject in the descriptions to follow.

An additional embodiment of the present invention is to provide human telepresence on the moon, mars and other locations in space utilizing proxy robot surrogates with artificial intelligence acquired from a set of template characteristics of a particular skill or discipline or from an interchange of information and field activities shared between the proxy robot and its human handler(s) on missions, whether such missions are practice sessions or actual work in space. The artificial intelligence may be instilled, for example, in such manner that each proxy robot functions as a human telepresence, a surrogate for one or more humans back on earth or at some other remote location. Each proxy robot surrogate may, for example, function as a telepresence ready to act in the place of that person or persons at any and all times.

An additional exemplary embodiment of the present invention is to provide human telepresence on Mars and other planets and locations far from earth utilizing proxy robot surrogates capable of largely operating autonomously in a manner closely emulating the behavior of their human handlers while still being subject to occasional commands and corrections from such handlers. Additionally, each proxy robot functions as a human telepresence ready and able to explore, construct, repair, maintain, discover and react in near-human fashion, either autonomously or semi-autonomously under partial or peridic human handler control.

Maximum human control and minimum acquired or learned behavior can result in proxy robots capable of being controlled by human handlers in real or near-real time. Round trip communications from earth to moon, for example, takes 2.6 seconds—perhaps 3 seconds with electronic delays factored in. This renders the moon, international space station and other near-earth platforms ideal candidates for proxy robots under complete human control, or an ideal proxy robot training ground for missions requiring a much higher degree of proxy learning and autonomy, the latter represented by slope 7 rightward, wherein a trained proxy can operate autonomously in a way that closely emulates its human handler(s).

Therefore, another exemplary embodiment of the present invention is to provide human telepresence on the moon, mars and other locations in space utilizing human proxy robots with artificial intelligence capability to allow them to be trained it to behave as much as possible like each of their human handlers.

In short, proxy robotics is rather distinct from robotics in the prior art sense, for the simple reason that each proxy robot functions as a human telepresence, surrogate for one or more humans back on earth. Telepresence in the sense of this specification doesn't just mean a human experiencing a moon or planet through the "eyes" and other "senses" of the proxy; it means a proxy human presence is there in the "person" of the proxy, ready and able to explore, construct, discover and react!

Thus, another exemplary embodiment of the present invention is to provide human telepresence on the moon, mars and other locations in space utilizing proxy robots with critical dimensions matching those of each of their human handlers.

Referring to FIG. 3 an exemplary and non-limiting comparison is shown of the general form of a proxy robot surrogate 11 and its human handler 10, with lines 12-31 showing critical points in height from the ground. For example, line 12 represents the top of the human's head; line 13, handler eye level; 14 is ear and nostril level; 15 mouth level; 16 bottom of chin; 17 bottom of neck; 18, height of shoulders and so forth, down to the bottom of the feet 31.

All points in human handler 10, including wrist, hip and finger joint placement 21-24 and finger length 25 as well as chest level 19, elbow 20, knee height 26, ankle level 27 and various toe and foot arch dimensions 28-30 should correspond as closely as possible with similar points in proxy robot 11 to give the proxy and its human handler the same overall experience.

One feature of the present invention is the capability of adjusting all these points in the proxy to level with corresponding points in its handler. If the robot is to be controlled by a team of, say, geologists, it might be "factory" adjusted to represent team average distances. Alternatively, manual adjustment to replicate a new human handler's dimensions might take place in the field, with either the proxy robot itself or another proxy robot doing the adjusting.

Furthermore, automatic, programmed adjustment could take place with each change of human handler, through motor, hydraulic or pneumatic control or other means, to readjust critical distances—including horizontal spacing between eyes (32, 33) and ears—when a geologist human operator change takes place, or when required by some particular circumstance of the mission itself.

Referring to FIG. 4, a scenario is depicted wherein a proxy robot is under maximum human control, as mentioned briefly under FIG. 2 above. This might be desirable where 1) the mission or activity can take place in real or near-real time; 2) where the mission or activity will serve to train the proxy robot; or 3) where budget constraints prevent the employment of robot proxies with the ability to acquire or learn behavior. To this last point, human-controlled proxy robots with little to no autonomous intelligence can essentially be standardized and mass-produced—even with factory or field-adjustable dimensions to make a proxy match its human handler—at relatively low cost as compared to small lots of custom-made, application-specific proxy robots with AI.

It should be emphasized that lack of autonomous intelligence doesn't mean a total lack of AI, since all proxy robot surrogates need what might be termed "motor intelligence" 58 sufficient to move smoothly, maintain balance, and operate within generally safe parameters. The latter may mean a "no can do" signal from a remote proxy robot in cases where its handler is attempting to make the proxy do something dangerous or unfeasible.

Standardization does not preclude fabrication of optional or customized parts for such proxies, including parts to fortify and shied the robot against extremes of temperature, humidity, weather, atmosphere or gravity; exposure to chemicals, organic elements, and biological threats; fire, projectiles, explosions and other severe and harsh environments.

In the exemplary embodiment illustrated in FIG. 4, a human handler 40 is paired with a proxy robot 41, such that the human receives sensual feedback 56 from the proxy in forms including visual (from a pair of eye-level cameras 45 in proxy 41 which are received on a pair of display screens 43 and 44 corresponding to the right and left eye, respectively, in display goggles 42 worn by the human); aural (46 and 47 in the proxy to earphones 48 and 49 in the human); olfactory from the robot 50, (which may, for example, be translated into some form of readable data or safe smell to human nostrils 51); "taste" in the proxy's "mouth" 52, useful in analyzing such chemical basics as acidity, salt content, sweetness and so forth by the handler and her/his mission team (not transmitted to handler's mouth 53 in this example but may be transmitted as useful data in readout or other form). In order to accomplish this identity of movements, another exemplary object of this invention is to provide human telepresence on the moon, mars and other locations in space utilizing human proxy robots with "eye" and "ear" spacing, "nostrils," "mouth", limbs, head, neck, torso, hinges and other joint dimensions matching corresponding dimensions on their human handlers to the greatest extent possible.

Along this line of thought, another exemplary object of this invention is to provide human telepresence on the moon, mars and other locations in space utilizing human proxy robots with "eye" and "ear" spacing, "nostrils," "mouth", limbs, head, neck, torso, hinges and other joint dimensions matching corresponding dimensions on their human handlers to the greatest extent possible, and manually adjustable in the factory or field to change any such dimensions to meet those of a new handler, to represent mean or average dimensions of a group of handlers, or to meet some particular set of mission requirements.

Yet another exemplary object of this invention is to provide human telepresence on the moon, mars and other locations in space utilizing human proxy robots with "eye" and "ear" spacing, "nostrils," "mouth", limbs, head, neck, torso, hinges and other joint dimensions matching corresponding dimensions on their human handlers to the greatest extent possible, and manually adjustable by either humans or proxy robots in the field to meet the dimensions of a new handler or some particular set of mission requirements.

Another exemplary object of this invention is to provide human telepresence on the moon, mars and other locations in space utilizing human proxy robots with "eye" and "ear" spacing, "nostrils," "mouth", limbs, head, neck, torso, hinges and other joint dimensions matching corresponding dimensions on their human handlers to the greatest extent possible, and automatically adjustable by motors, hydraulics, pneumatics or similar means to meet the dimensions of a new handler or some particular set of mission requirements.

A further exemplary object of this invention is to provide human telepresence on the moon, mars and other locations in space utilizing human proxy robots capable of providing accurate visual, aural, olfactory, tactile and other sensual data to a human handler such that the handler experiences to the greatest extent possible, the experience of actually being there in the body of the proxy robot.

Other feedback from proxy to human handler is positional and tactile in nature, and may include haptic feedback in addition to data on environment and specific object feel, texture, weight and so forth. As the human handler receives all this sensory and other data, she/he reacts with commands and "follow me" movements to be replicated by the proxy robot, whether on the surface of the moon, deep in the sea or trekking across some desert or ice field on earth.

Thus, another exemplary object of this invention is to provide human telepresence on the earth, on the moon and at other locations near earth utilizing human proxy robots which receive tactile data from their human handlers and following each and every move of each handler in "follow me" commands.

Additionally, in another exemplary embodiment of the present invention is the provision of two-way data and communication channels between proxy robots and their handlers, including channels from proxy to human with video, sensory, positional and analytical data.

Thus these exemplary embodiments provide two-way data and communication channels between proxy robots and their handlers, including channels from handler to proxy with "follow me" positional data and mission commands.

This provision also allows for send/receive headsets for human handlers operating proxy robots as a team, whereby the handlers can communicate among themselves and with other mission specialists while operating their individual proxies, and data terminals for further communication among team members and mission specialists when the proxy robots are off-line. This embodiment can provide the send/receive headsets and data terminals for human handlers operating proxy robots as a team, whereby the handlers can communicate not only among themselves and with other mission specialists, but also by such means with individual proxy robots capable of receiving such data and/or with voice recognition capability to translate voice commands into action.

Indeed, this scenario of proxy robot surrogates under human control has many uses on earth as well as in more distant places like the moon: disaster response (fire, severe weather, flooding, environmental including disease, radiation, mining and other accidents to mention a few), exploration or activity in extreme conditions such as ocean depths, volcanic activity, rarified atmosphere, extreme hot or cold, or where danger is real and present in any form.

Thus, another embodiment of the present invention is to provide human telepresence on the moon, mars and other locations in space utilizing proxy robots trained to emulate human specialists in geology, planetary science, life science, construction, mechanics and robot repair.

Speaking of danger, a huge benefit of human-proxy robot teamwork is that, should something happen to the proxy, its "death" would not be in vain, since all data and behavioral learning would exist apart from the proxy itself, which could quickly be rebuilt or replaced by a new unit.

In sum, sensory and similar feedback goes from proxy robot to human handler in this scenario, while command and control signals flow from handler to proxy—including "follow me, do as I do" instructions directly from tactile points, hinges and joints 54 in the human to corresponding motor control circuits 55 in the proxy.

There are a number of means by which the handler's every movement can be monitored and sent as a set of "follow me" commands 57 to the proxy robot. In one presently preferred embodiment of the invention, motion capture technology of the sort used by Hollywood to translate human movement into animation is adapted for use by handlers guiding proxy robots, with three or more motion capture cameras 37-39 continuously monitoring critical points of movement 54 on the human handler.

Motion capture from the perspective of an animated motion picture such as "Avatar" (above) utilizes a great deal of processing power to render animated images that move in synch with the movements of a human. In utilizing motion capture technology wherein a human handler sends "follow me" commands to her proxy robot, a different set of constraints apply. On one hand, much less processing power is necessary, since the goal is not to render complex graphics. However, that processing which needs doing in this invention must be very fast, since proxy robotic movement must be as close as possible to real-time.

Put another way, cameras or other means (including infra-red, laser echo, radar, RFID, light reflection and so forth) can monitor the handler and capture all motion in a manner which may be similar to the video motion capture techniques employed by Hollywood, but the way the resulting motion data is processed and utilized for real-time proxy robot movement is novel and distinct.

Other ways exist to translate human handler movements into proxy robot movements. For example, the handler could wear special clothing, including helmut, gloves and shoes with built-in strain gauges or other such mechanisms to signal changes in joint hinges, head movement and so forth. In the figures to follow, it is to be assumed that motion capture of one sort or another is present in all cases.

Referring to FIG. 5 another embodiment of the invention is shown, wherein a proxy robot surrogate 61 has the AI capacity 59 to learn from interaction with its human handler 60. At the extreme, this scenario may be the exact opposite of FIG. 4 above, with handler 60 doing the entire work and proxy robot surrogate 61 absorbing it all into its learned memory.

In such a scenario, a human geologist "mentor" may comb trough a field of rocks and outcroppings, paying particular attention to specific places and items of interest while her/his proxy robot "student" takes it all in. Or the pair may undertake practice activities like exploration together, with the human guiding and teaching her/his robotic companion. In still another scenario, the human-robot pair go on a real mission together—to a site of geological interest, the scene of a disaster, an active volcano—and perform useful work while the proxy robot reacts and learns (see FIG. 6).

While all the sensory data flowed from proxy robot to human handler in FIG. 4, in the present case (FIG. 5) such feedback data 62 largely originates with the handler and flows to the proxy. For example, sensory data 69*a* includes input data from video cameras 64 near the eyes of the human mentor. (The proxy needn't have cameras if it is operating in passive learning mode, but may have such cameras if the pair is operating as a team; in any event, the proxy never needs a display screen because it is a robot and doesn't have human vision!) Other sensory data like sound, smell and taste may also be sent from the human handler to the learning center in the proxy robot's AI 59. Thus, the proxy remembers sounds (audio) processed through microphones 66 and 67 on the handler's ears, and even smells 65 and tastes 68 as well as all movement captured by a multitude of motion and pressure sensors located strategically on the human (see the human side of feedback path 62). Additional data flow from handler to proxy from tactile points 69*b* in the handler registering feeling (texture), weight and so forth.

All of this "emulate me" data, plus any other commands the human cares to convey, are fed to the proxy in a command and control stream 63.

Referring to FIG. 6 depicts a scenario referenced briefly in FIG. 5 above, wherein a human handler and proxy robot operate side-by-side as a team. In this instance, human 70 is mentor first and handler only as necessary, while proxy 71 works with the handler rather than simply emulating her/his movements.

Since feedback data 72 flows in both directions, handler 70 will have goggles that include cameras 73 as well as display screens 75, while proxy 71 will have a pair of camera "eyes" 74 to provide visual data to the handler. So video will flow both ways, to the human's displays and to the proxies learning memory banks. The same can be said for audio, shared between human (via earpiece microphone/speakers 76, 77) and proxy robot, including audio from proxy's microphone "ears" 78 and 79. Whatever the human handler smells 80 will be recorded in data form by the proxy robot's AI, and whatever the proxy's "nose" 81 senses will likewise be translataed into a gas analysis readout for the handler and mission team. Similarly, taste sensations in the handler's mouth 82 will be stored as data by the proxy, while data from the proxy robot's "mouth" sensor 83 will be conveyed back to the human handler and mission specialists.

Tactile feedback 84 will mostly take place from handler to proxy's learning memory, but will not constitute "follow me" instructions 85 unless warranted. Operational commands 85 from handler to proxy will also be on a strictly "as needed" basis. This "as warranted" proviso will require some sort of "pay attention, this is important" instruction from the human handler to her/his learning proxy robot partner. Proxy Robot 71 contains advanced AI 86 capable of supporting learned and stored intelligence and behavior.

Referring to FIG. 7 a situation is depicted as might be encountered on a mission to mars or some other place too costly in risk and treasure for humans to achieve with any frequency. Since such remote locations also have the hurdle of long communication delays (5 to 40 minutes round trip from earth to mars), real-time "follow me" instructions would not be practicable.

Thus, the scenario of FIG. 7 is a proxy robot with AI capability 89 to operate in near-autonomy, still communicating on a delayed basis with its handler(s) but generally not reliant on constant handler guidance. In short, this proxy robot has AI memory full of human-emulating behavior, exploring mars or a similar environment as surrogate for the human or humans whose knowledge and behavior it has received. In this case, all that learning is almost certainly acquired rather than learned "first person," since a mission to mars is hardly a place to send a previously used proxy robot: in human terms that might spell "mission-seasoned," but in robot terms it just adds risk of early failure.

Therefore, another exemplary object of the present invention is to provide human telepresence on the moon, mars and other locations in space utilizing proxy robots with artificial intelligence acquired from other human-proxy robot missions, experience and memory.

In this scenario, all feedback 102 is from proxy robot to human handler(s), with "follow me" instructions impracticable except in the most dire of circumstances (e.g., to lead a damaged robot back to other proxy team members able to repair it), and operational commands 104 few and far between due to the long communication lag time. Nevertheless, the camera "eyes" 92 of proxy robot 91 convey what it "sees" to goggles or a head-mounted display 93 on the handler 90 and other mission personnel, as it does gas analysis "smell" 94 and "taste" 100, although these two functions are more apt to be translated into data than actually smelled 95 or tasted 101 by the handler. Sounds from the robot's microphonic "ears" 96 and 97 are converted to data for the journey back to earth, but may well be re-translated into sounds for the earphones 98 and 99 of the human handler and other mission specialists. Tactile analysis 103 is also sent from proxy robot to handler, and may include haptic feedback and/or data readouts.

The figure to follow will discuss a lunar team of proxy robots, but it should be pointed out that any proxy mission to mars or a similar venue would also be a team of near necessity, with proxy members specialized in mission-specific tasks and disciplines including not only things like geology and life sciences but also construction and robot repair. These proxy robots or their proto-proxy memory banks would have worked long and hard on planet Earth to perform their mission as a close-knit team with a good deal of autonomy and latitude when necessary.

In a not-too-distant future, it may be possible to utilize the collective experience of space missions with proxy robots in developing a new generation of robots capable of operating in relative autonomy on distant planets and their moons, possibly aided by a docking station on the moon built by proxy robots in the shorter term.

Referring now to FIG. 8 the top panel depicts three proxy robots operating as a team on the lunar surface. Proxy robot 110 is drilling something 113 (perhaps preparing a hole for a core sample or some construction), proxy robot 112 is holding something 114, and proxy robot 111 stands ready to step in.

If this event is indeed taking place on earth's moon, it is quite likely that each of the three proxy robots is connected to and being operated by a human back on earth: humans that have trained as a team for months or even years (see three bottom panels). Human control might be total, or each proxy might have a certain degree of autonomy, depending on the definition of the mission itself, or on the timing of this particular mission in the sequence of things.

Therefore, another exemplary object of the present invention is to provide human telepresence on the moon and other locations near earth utilizing proxy robots capable of being controlled by one or more human handlers in real or near-real time.

More specifically, proxy robot 110 is "tethered" by a two-way communication link 115-116 to its handler 130, on earth, on a space station or orbiting module, or even at a base elsewhere on the moon. But the most probable scenario is that these human handlers are operating from an earth base. One channel 115 in link 115-116 consists of video, analytical, positional, and other data going from proxy 110 on the moon to its handler 130 on earth, while another channel 116 contains "follow me" instructions and other data and commands which originate on earth with handler 130 and are received and executed by proxy 110.

Similar two-way communications and data links 122-123 and 126-127 connect proxy robot 111 to its human handler 131 and proxy 112 to handler 132, respectively. On the moon, all six channels become part of a broader mission communication data stream 117 which is transmitted to the mission base on earth or another location over a path 118 that may be via radio or by another transmission means such as light modulation.

Components of the broad stream will be available for not only the proxy robot handlers but for other mission personnel including scientists, and stored as well for future use and analysis. On the earth, that broad mission communication stream 119 is separated into components including two-way data channels 120-121 directed to human handler 130, two-way data channels 124-125 directed to human handler 131, and two-way data channels 128-129 directed to human handler 132.

Note that the body positions of all three handlers correspond exactly to the positions of their three proxy robots. For example handler 130 is gripping 134 the virtual representation of tool 113 on the moon, while handler 132 wraps his fingers 135 around whatever it is 114 that proxy 112 is carrying. Each human handler will wear goggles, helmet or mask 133 to see exactly what their particular robot sees. In each case, a turn of the head will change that view, allowing handlers and other mission personnel various views of the mission in near real-time.

Shown as points 136 on the body suit worn by handler 130, a number of points will track all body movements of each handler, right down to their fingers and toes. Signals from this spatial and haptic tracking will drive the position and movements of each proxy robot during the mission, while signals from similar points (discussed previously) on each robot will provide such haptic feedback messages to each handler as texture, pressure, temperature, gas chromatography (possibly through the proxy's nostrils but on a screen analysis for delicate humans) and other chemical analysis which might take place in the robot's (but not the human's) mouth.

As proxy robot 111 has its back to us, its corresponding human handler 131 is in the same position, while robot 110 and its human operator 130 are looking down at the work being undertaken, and handler 132 and her/his proxy 112 look toward us. Note the headsets with microphones worn by handlers 130 and 132: while this is largely for communication between the handler team, and between handlers and other (human) mission personnel, voice recognition in the proxy robots is most certainly a possibility as well.

Data terminals may be provided In addition to send/receive headsets for human handlers operating proxy robots as a team, whereby the handlers can communicate among themselves and to other mission specialists while operating their individual proxies.

An additional exemplary object of the present invention is the inclusion of photovoltaic panels in the construction of robots for space exploration to extend mission time between battery charges and provide backup energy for communication and mobility in emergencies such as battery failure.

FIGS. 9A and 9B depict a method of harvesting solar energy to maintain batteries and electrical systems functional for an extended period in proxy robots through the provison of built-in photovoltaic panels 140 on the upper surfaces of a cap, hat or helmut 141, including dome portion 142 and sunshade portion 143. Such a cap is also useful in shading robotic eye cameras from direct sunlight.

Photovoltaic panels may also be included on shoulder/breastplate 144. Although the figure depicts 6 individual cells or sections in breastplate 144, this is for illustration purposes only, and any number of sections or cells may be employed.

Photovoltaic panels may also be placed on the top facing surfaces of the feet 145. FIG. 9B is a rear view of the dome 147 and sunshade 148 of the cap, hat or helmut, while 146 represents photovoltaic panels on the upper back and shoulder area.

All photovoltaic panels generate electrical energy when exposed to sunlight or other radiation which can be utilized to charge batteries in the robot or perform other useful work including emergency backup power for communication and mobility in the event of battery failure.

Feasibility studies could be undertaken by proxy teams for the use of the moon as a platform tremendously better and more stable than any space station for such activities as earth monitoring (weather, climate, seismic activity, volcanism and political activities to mention just a few); astronomy (think of an earth-size telescope on the moon, where viewing conditions are improved by many of orders of magnitude); lunar seismic and other monitoring; and improved studies of the sun, planets and other bodies in our solar system.

Another exemplary object of this invention is to provide human telepresence on the earth, utilizing proxy robots in response to disasters including fire, earthquakes, severe weather and flooding; to environmental issues including disease and radiation; to mining and other accidents; for exploration, recovery or other activities in extreme conditions such as ocean depths, volcanoes, the rarified atmosphere of altitude, extreme hot or cold, or where danger is present in any form.

An additional exemplary object of this invention is to provide for teams of human proxy robots under direct human control to carry out missions on the earth, on the moon and at other locations in near earth locations, where individual robotic team members are operated by humans specialized in fields including geology; planetary science; life science; emergency response, whether human or robotic; human medicine; robot maintenance and repair; and mining, soil, rock and other sample analysis.

A further object of this invention is to provide for teams of semi-autonomous human proxy robots, training together or executing missions on the earth, on the moon and at other locations in near earth locations, where individual robotic team members may be specialized in fields including geology; planetary science; life science; emergency response, whether human or robotic; human medicine; robot maintenance and repair; and mining, soil, rock and other sample analysis.

An additional exemplary embodiment of this invention is to provide for teams of human proxy robots operating either semi-autonomously or under direct human control to carry out missions on the earth, on the moon or on space platforms or other near-earth locations, where individual robotic team members are operated by humans specialized in fields such as construction of communication or observation platforms, assembly of telescopes and other instruments, landing and launch areas, shelters and habitations for human dwellers, or mines or resource processing facilities.

A further embodiment of this invention is to provide for teams of human proxy robots operating either semi-autonomously or under direct human control to carry out missions on the earth, on the moon and at other locations in near earth locations, where individual robotic team members are operated by humans specialized in fields including geology; planetary science; life science; emergency response, whether human or robotic; human medicine; robot maintenance and repair; mining; and soil, rock and other sample analysis.

Along this line, another object of this invention is to provide a middle course between robotic and manned space missions that goes far in satisfying the need for human presence while avoiding the inherent risks and enormous cost to send human astronauts to places like the moon and Mars: a method of achieving human telepresence to explore the solar system without the risk to life and huge costs involved in actually transporting humans around space with exploration undertaken by means of robot proxies "trained" and operated by specialists on earth who see what the proxy sees, feel what it feels, and assist it in making judgement calls in their mutual specialty.

Moreover, an object of the present invention is the mass-production of standardized proxy robots at comparatively low cost made to function under total or near-total human control and operate in a wide variety of environments.

An additional exemplary embodiment of the present invention is the mass-production of standardized proxy robots at comparatively low cost, with the additional provision for optional or customized fabrication or parts for deployment where the operating environment may include one or more of extreme temperature, extreme humidity; severe or violent weather; unusual atmosphere or gravity considerations; and exposure to chemicals, organic or biological hazards, radiation, fire, projectiles and explosives.

A further exemplary embodiment of this invention is to utilize the collective experience of space missions with proxy robots in developing a new generation of robots capable of operating in relative autonomy on distant planets and their moons in a future generation.

What is certain is this: all the technology exists to place proxy robot feet on the moon sooner rather than later. Moreover, ample technology already exists to build such proxy robots, particularly those that do not require a high degree of learned or acquired behavior. The latter could follow in relatively short measure.

Some firmly believe that a human presence is absolutely necessary on the moon, mars and other heavenly bodies, while others are just as certain that remote-controlled machines and instruments give far more return for each dollar invested. Both positions merit consideration: manned exploration proponents state convincingly that human "boots on the ground" can do so much more than even the smartest and most cleverly-designed machines, while advocates of remote exploration by machines cite the inherent cost difference and risks involved in sending humans rather than machines to explore our neighboring bodies in space.

The present invention proposes a middle course that goes far in satisfying the need for human presence while avoiding the inherent risks and enormous cost to send human astronauts to places like the moon and mars. Described above is a method of achieving human telepresence to explore the solar system without the risk to life and huge costs involved in actually transporting humans around space; namely, exploration by means of robot proxies "trained" and operated by specialists on earth who see what the proxy sees, feel what it feels, and assist it in making judgment calls in their mutual specialty.

Thereafter it should be possible to utilize the collective experience of space missions with proxy robots in developing a new generation of robots capable of operating in relative autonomy on distant planets and their moons in a future generation, possibly aided by a docking station on the moon built by proxy robots in the shorter term. The time has come to return to the moon and plan for exploration of mars and other planets.

I claim:

1. A method of space exploration with proxy robot surrogates, comprising:
    deploying at least one proxy robot surrogate enabled for an extraterrestrial mission,
    wherein a motion of the at least one proxy robot surrogate is determined by follow-me signals transmitted from a proxy robot control environment on earth including a body suit adapted for a human handler;
    sending video, sensory, positional and analytical data from the at least one proxy robot surrogate in space to the proxy robot control environment on earth;
    capturing a motion of the body suit in the proxy robot control environment on earth by at least one camera external to the body suit and sensor means in contact with the body suit, wherein the camera and sensor means continuously monitor a position and each motion of the body suit;
    translating the captured motions into follow-me signals, wherein the follow-me signals originate from the camera and the sensor means; and
    directing the follow-me signals from the proxy robot control environment on earth to corresponding motor control means in the at least one proxy robot surrogate in space,
    wherein the at least one proxy robot surrogate further comprises a plurality of anatomical features corresponding dimensionally to anatomical features of the body suit;
    manually adjusting the anatomical features in a factory or a remote mission setting to change the anatomical features to meet those of a different body suit adapted for a different human handler, and
    wherein manual adjustments are made at the remote mission setting by either a technician or by at least one additional proxy robot surrogate in the remote mission setting to meet the anatomical features of the different body suit or a set of mission requirements.

2. The method of claim 1, wherein the at least one proxy robot surrogate is designed for operation by receiving follow-me signals in real or near real-time; and
    wherein the received follow-me signals operates at least a motor control function overseeing smooth movement, balance and hazard avoidance.

3. The method of claim 1, wherein the anatomical features include eye cameras, ear spacing, nostrils, mouth, limbs, head, neck, torso, and joints.

4. The method of claim 3, wherein the anatomical features of the at least one proxy robot surrogate further comprising:
    adjusting the anatomical features to represent dimensionally a mean or average of the anatomical features of a plurality of body suits, or
    adjusting the anatomical features to represent some particular set of mission requirements.

5. The method of claim 4, wherein adjusting the anatomical features further comprising at least one of motors, hydraulics and pneumatics that automatically adjust to the dimensions of the different body suit adapted for the different human handler or the set of mission requirements.

6. The method of claim 1, wherein the at least one proxy robot surrogate is capable of transmitting accurate visual, aural and tactile data to the proxy robot control environment.

7. The method of claim 1, wherein the at least one proxy robot surrogate is enabled to receive follow-me movement and positional data from the proxy robot control environment, and
    wherein the at least one proxy robot surrogate emulates every motion of the body suit.

8. The method of claim 1, further comprising two-way data and communication channels between the at least one proxy robot surrogate and the proxy robot control environment, including channels from the at least one proxy robot surrogate to the proxy robot control environment with video, aural, tactile, positional and analytical data; and
    wherein channels from the proxy robot control environment to the at least one proxy robot surrogate include follow-me motion and positional data.

9. A system of space exploration utilizing proxy robot surrogates comprising:
    at least one proxy robot surrogate enabled for an extraterrestrial mission, wherein the at least one proxy robot surrogate has limbs, head, neck, torso, joint hinges, and other dimensions adjustable to mirror the dimensions of a body suit adapted for at least one human handler on earth;
    a control device capable of allowing the at least one proxy robot surrogate to emulate every move of the body suit wherein the control device comprises follow-me signals to engage a motor control means corresponding to hinges and joints in the at least one proxy robot surrogate, and wherein the follow-me signals originate from a monitoring means tracking movement and position changes in the body suit; and
    a communication means to enable the at least one proxy robot surrogate to receive the follow-me signals from the said monitoring means and to enable the proxy robot surrogate to send video, sensory, positional and analytical data to a proxy robot control environment on earth;
    wherein the at least one proxy robot surrogate further comprises a plurality of anatomical features corresponding dimensionally to anatomical features of the body suit;
    manually adjusting the anatomical features in a factory or a remote mission setting to change the anatomical features to meet those of a different body suit adapted for a different human handler, and
    wherein manual adjustments are made at the remote mission setting by either a technician or by at least one additional proxy robot surrogate in the remote mission setting to meet the anatomical features of the different body suit or a set of mission requirements.

10. The method of claim 1, wherein the sensor means further comprise sensors on tactile points, hinges and joints on the body suit.

* * * * *